United States Patent [19]

Hanna

[11] Patent Number: 4,462,133
[45] Date of Patent: Jul. 31, 1984

[54] VEHICLE WASHING APPARATUS WITH ELEVATABLE WASHING ELEMENTS

[76] Inventor: Daniel C. Hanna, 1133 SW. Rivington Dr., Portland, Oreg. 97201

[21] Appl. No.: 458,537

[22] Filed: Jan. 17, 1983

[51] Int. Cl.³ .............................................. B60S 3/04
[52] U.S. Cl. ................................. 15/97 B; 15/DIG. 2
[58] Field of Search .............. 15/97 B, DIG. 2, 53 A, 15/53 AB, 53 R, 4

[56] References Cited

U.S. PATENT DOCUMENTS 3,160,903 12/1964 Grass .................................... 15/97 B
3,403,417 10/1968 Hanna et al. ...................... 15/53 AB Primary Examiner—Edward L. Roberts
Attorney, Agent, or Firm—Klarquist, Sparkman, Campbell, Leigh & Whinston

[57] ABSTRACT

A vehicle washing apparatus includes vertically extending curtain-like washing elements suspended from an overhead support structure. A carriage assembly moves the overhead support structure back and forth through a vehicle bay so that the washing elements wash a car within the bay. An elevating mechanism on the carriage is selectively operable to lift the curtain-like elements out of the way of a vehicle to enable manual washing of the vehicle. The elevating mechanism includes a horizontal bar that moves laterally against the curtain-like elements in one direction to swing an upper portion of the elements upwardly and a horizontal roll of water resistant sheet material that is unrolled laterally against the curtain-like elements in an opposite direction below the level of the bar to swing a lower portion of the elements upwardly onto the sheet.

18 Claims, 9 Drawing Figures

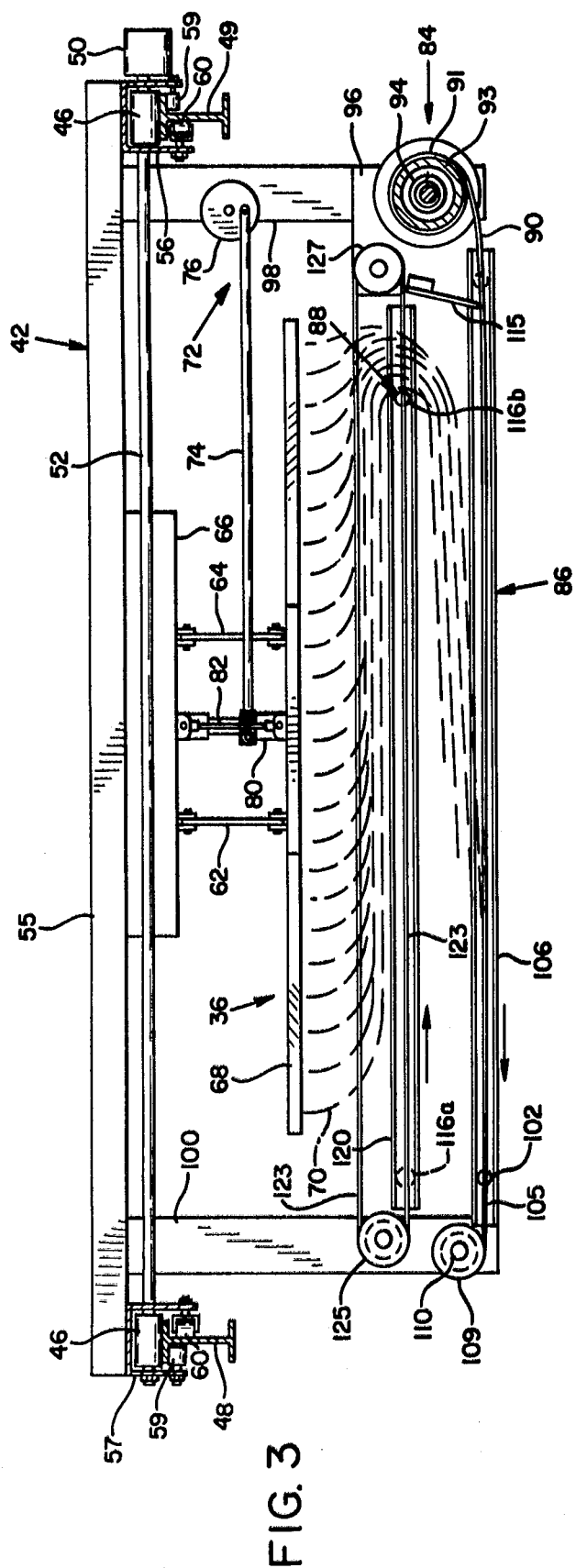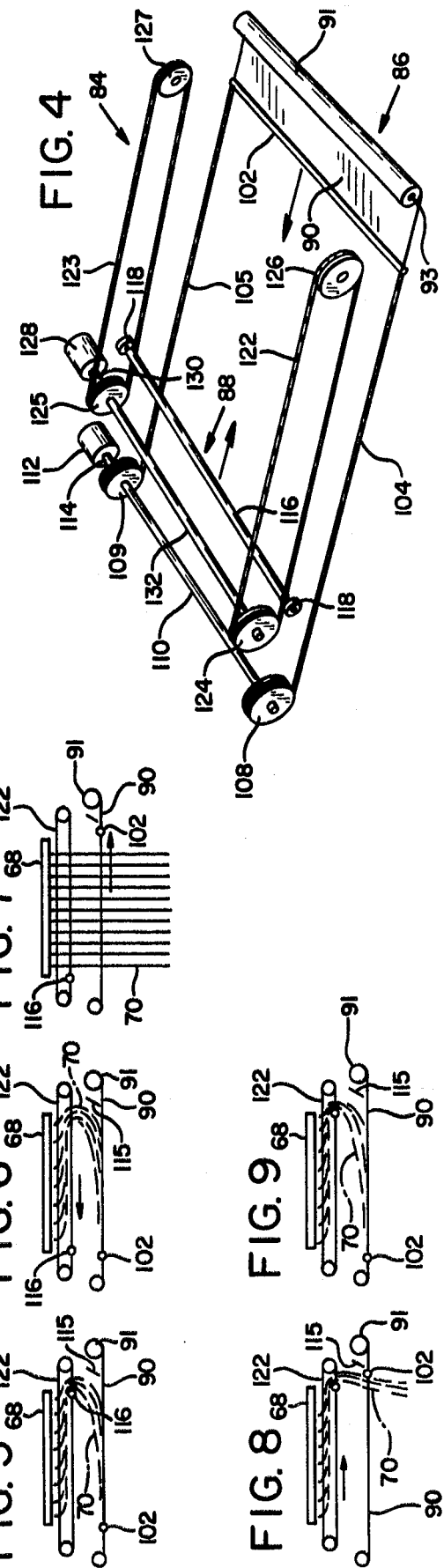

VEHICLE WASHING APPARATUS WITH ELEVATABLE WASHING ELEMENTS

BACKGROUND OF THE INVENTION

1. Field of the Invention

The present invention relates to a vehicle washing apparatus of the type having vertically suspended curtain-like washing elements and more particularly to means for displacing such elements to an inactive position to enable manual washing of a vehicle.

2. Description of the Prior Art

Some commercial car washing operations include both manually operated and automatically operated washing equipment within the same car washing bay. The customer has the choice of using only the manual equipment for one price or both the manual and automatic equipment for a greater price. The conventional automatic washing equipment includes either rotatable brushes or depending flexible curtain-like washing elements called "mitters". More specifically, a mitter is a fabric panel usually cut into multiple strips and suspended vertically from an overhead support structure. Washing occurs through relative movement between the car and brushes or mitters. When the automatic washing apparatus includes mitters, they are often moved back and forth through the vehicle bay while oscillating or reciprocating to clean all but the lowermost portions of the vehicle. Any portions not reached by the mitters are washed manually. Mitter apparatuses of this general type are shown, for example, in applicant's prior copending U.S. patent application Ser. No. 06/437,454 filed Oct. 28, 1982 and in the U.S. patents identified on page 1 of such application.

If the customer in a car wash facility having both manual and automatic mitter washing capability elects to wash a car entirely by hand, it is necessary to move the mitters out of the way. Heretofore, under such circumstances the mitters have usually been moved to one end of the vehicle bay where they will not interfere with the manual washing of a car. However, mitters moved to such position do take up valuable space, usually requiring the bay to be substantially longer than might otherwise be necessary. They also interfere with vehicle ingress to and egress from the bay.

Some prior U.S. patents suggest that suspended flexible washing or drying elements might be elevated out of the way of a vehicle to enable it to be washed manually. For example, Beer et al. U.S. Pat. No. 4,207,643, Weigele et al. U.S. Pat. No. 3,504,394, and Pulliam U.S. Pat. No. 1,908,788 suggest the use of an endless conveyer above the vehicle which suspends the washing or drying elements, with the elements being in contact with the vehicle as they move along a lower run of the endless conveyer but spaced above the vehicle as they move along an upper run of the conveyer. However, such a solution would be unsatisfactory as applied to washing mitters. First, although the endless conveyer might alleviate the horizontal space problem, it would create a vertical space problem requiring an abnormally high bay and attendant supporting structure. Second, the use of an overhead endless conveyer would cause the mitters to drip liquid onto the vehicle below. Third, the use of such overhead conveyers would likely not be applicable to long mitter washing strips because of the possibility of the strips becoming tangled with themselves and the conveyer mechanism as they travel along the upper run of the conveyer.

Wilson U.S. Pat. No. 2,854,680 discloses the use of an overhead trolley with a depending reel and cable arrangement for raising and lowering a power scrub brush mechanism to reach different vertical levels of a vehicle being washed. It is apparent from the Wilson patent that the mechanism disclosed is not intended to hoist the scrubbing mechanism vertically out of the way of the vehicle because inadequate clearance is provided for this purpose. Moreover, if a cable and reel-type mechanism were employed to lift mitter assemblies above a vehicle, an impractically high bay would be required for this purpose.

It is understood that Belanger Company of Northville, Mich. has manufactured car wash installations having mitter-type washers in which the entire mitter assembly including its supporting structure is elevated vertically out of the way when desired, using a complex counterweight mechanism. This solution to the problem of moving mitters out of the way when desired for unobstructed manual washing and vehicle ingress and egress has the same drawbacks as those previously mentioned with respect to the other prior art. Such a lifting mechanism requires an excessively high bay and does not prevent liquid on the mitters from dripping onto a vehicle below.

Accordingly, there is a need for a satisfactory means for displacing mitters to an inactive nonobstructing position within a vehicle washing bay while taking up a minimum of vertical and horizontal space within the bay.

It is therefore a primary objective of the present invention to provide an apparatus which fulfills the foregoing need and which overcomes the aforementioned deficiencies of the prior art.

More specifically, an object of the invention is to provide a vehicle washing apparatus of the mitter type which can be moved to a nonobstructing position when not in use without taking up additional space that would not otherwise be needed.

Another specific object is to provide a washing apparatus as aforesaid which enables a reduction in the overall length of a vehicle washing bay without any increase in the height of such bay.

Another specific object is to provide a washing apparatus as aforesaid which will not drip liquid onto a vehicle when moved to its inactive, nonobstructing position.

Another object is to provide an apparatus for elevating suspended mitter-type cleaning elements to an inactive position above a vehicle without elevating the support structure for such elements.

Another object is to provide an elevating apparatus as aforesaid which can be used in conjunction with a mitter assembly which moves back and forth through a washing bay to clean a vehicle therein.

Another important object is to provide a mitter elevating apparatus as aforesaid which can be retrofitted to existing mitter assemblies to convert all-automatic vehicle washing systems to automatic-manual systems in existing bays.

Other objectives are to provide a mitter elevating apparatus as aforesaid which is simple, economical to manufacture, and relatively maintenance free.

SUMMARY OF THE INVENTION

The present invention is an apparatus which elevates to an out-of-the-way position the flexible suspended cleaning elements of a mitter-type washing apparatus in a washing bay without elevating the support structure for such elements. In a preferred embodiment, the cleaning elements are elevated by a laterally displaceable means movable into the vertically suspended cleaning elements at a level between their upper and lower ends to swing such elements upwardly relative to their overhead support means.

The laterally displaceable means may include a laterally extensible sheet-like member so that when the cleaning elements are swung upwardly, they become supported on the sheet-like member. The sheet-like member may be impervious to water so that the elements do not drip washing liquid onto a vehicle below. The sheet-like member may be rolled onto a spring-biased spindle in its retracted, inactive position.

The laterally displaceable means may also include a horizontally disposed bar that is displaceable laterally into the hanging cleaning elements above the level of the sheet-like member and in a direction opposite the direction of extension of the sheet-like member so that an upper length of the elements is swung upwardly in one direction and a lower length of the elements is swung upwardly in an opposite direction in folded relationship to the upper length to conserve storage space for the elements in their upwardly retracted positions.

Both the mitter assembly and the elevating assembly may be mounted on a carriage for longitudinal movement through a vehicle washing bay. The laterally displaceable portion of the elevating means may be displaceable in a direction normal to the direction of carriage movement within the bay.

The foregoing and other objects, features, and advantages of the present invention will become more apparent from the following detailed description which proceeds with reference to the accompanying drawings.

BRIEF DESCRIPTION OF DRAWINGS

In the drawings:

FIG. 3 is a vertical sectional view taken approximately along the line 3—3 of FIG. 1;

FIG. 4 is a perspective view of the elevating apparatus of FIG. 3; and

FIGS. 5-9 are schematic sequential views illustrating the operation of the elevating apparatus of the invention.

DETAILED DESCRIPTION OF A PREFERRED EMBODIMENT

Figure 1:
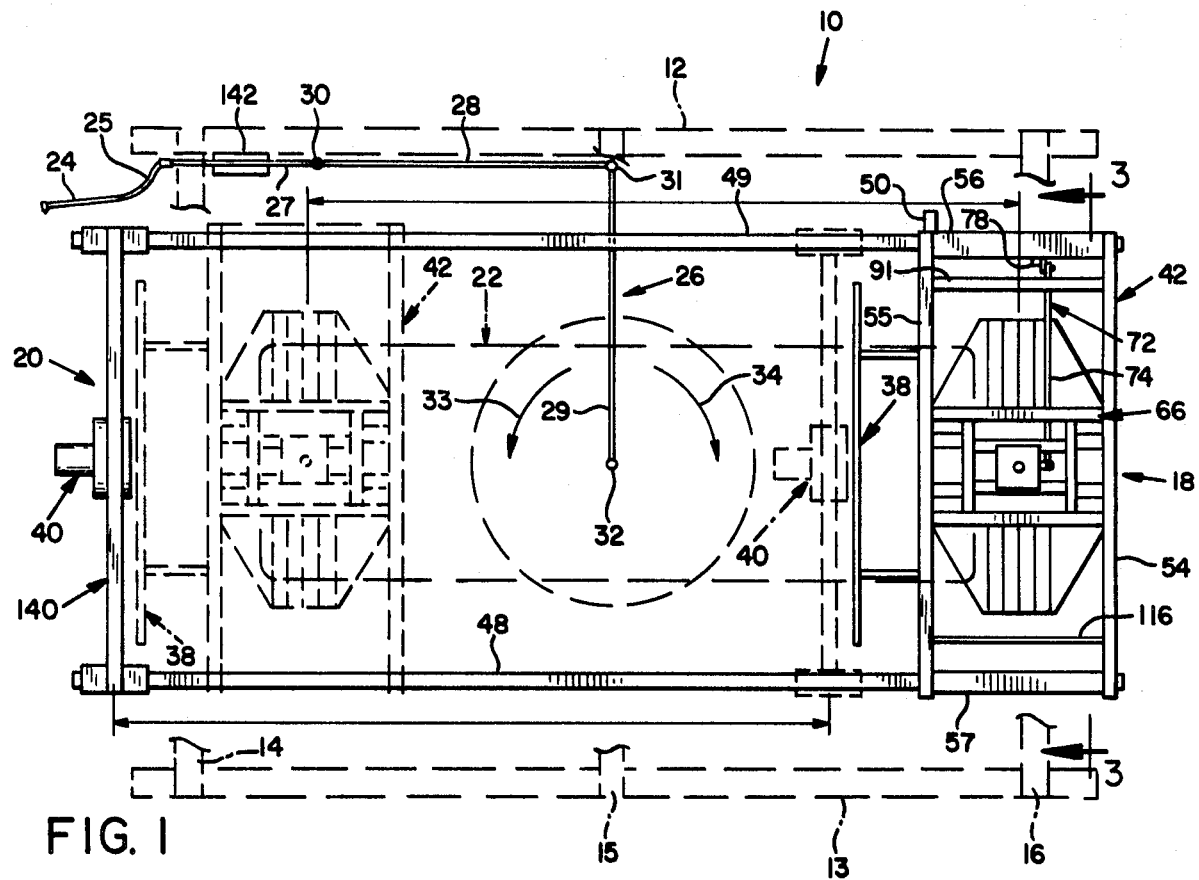
FIG. 1 is a top plan view of a vehicle washing bay including a mitter-type washing apparatus and a mitter elevating apparatus in accordance with the invention.
Figure 2:
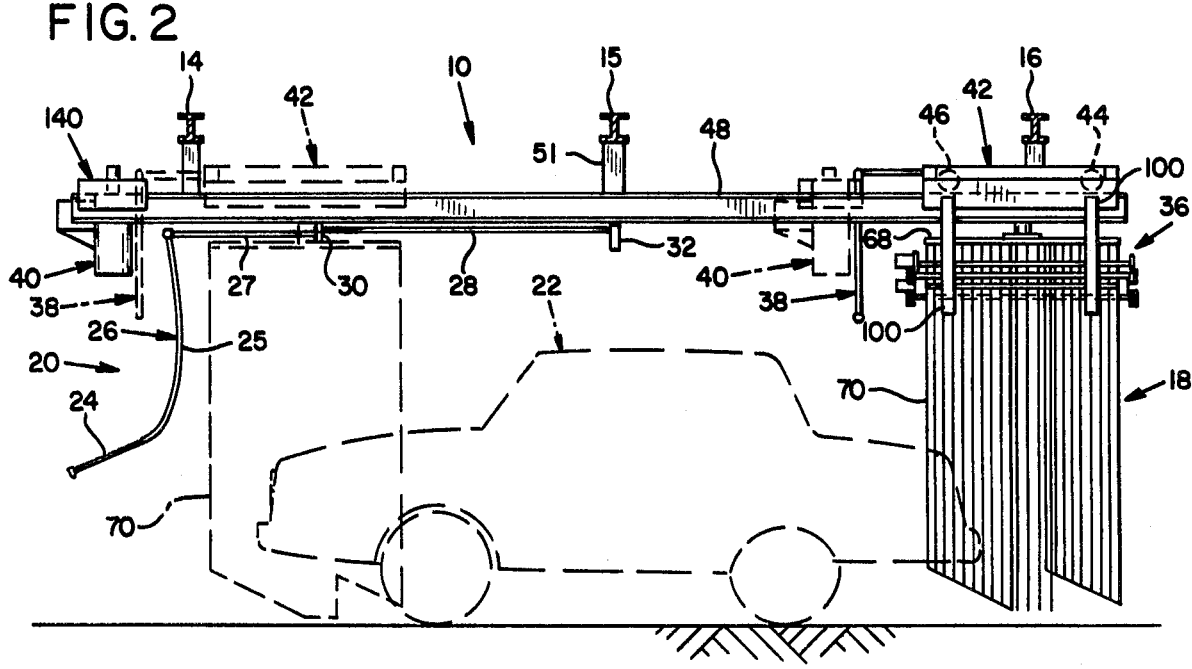
FIG. 2 is a side elevational view of the washing bay of FIG. 1.

Referring to FIGS. 1 and 2, a vehicle washing bay 10 is defined by opposite sidewalls 12,13 supporting horizontal roof beams 14,15,16 for supporting a roof structure (not shown). The bay includes opposite entrance and exit end openings 18,20 through which a vehicle depicted at 22 can be driven into and out of the bay. While being washed, the vehicle is stationary within the bay.

A car washing apparatus is housed within the bay, including both manual and automatic washing means. The manual washing means includes a washing spray wand 24 connected by a length of hose 25 to an articulated water supply arm 26 including three arm sections 27,28,29 interconnected by pivot couplings 30,31. The inner end of arm section 29 is connected by an overhead pivot coupling 32 to a source of water (not shown) to provide such section with a 360 degree range of movement in a horizontal plane in either direction as indicated by arrows 33,34 in FIG. 1.

The automatic washing means includes by way of illustration three separate cleaning elements. These include a mitter washing assembly 36, a washing and rinsing spray bar means 38, and an air drying apparatus 40. Mitter assembly 36 and spray bar 38 are supported on an overhead carriage 42 movable on pairs of rolls 44,46 along a pair of longitudinally extending parallel tracks 48,49 suspended by straps 51 from roof beams 14-16 on opposite sides of the bay. As shown in FIG. 3, track members 48,49 comprise a pair of I-beams. The pair of carriage rolls 46 is driven by a hydraulic motor 50 coupled directly to the right-hand roll 46 of FIG. 3 and coupled through a long transverse shaft 52 interconnecting the two rolls 46 to the left-hand roll of the pair.

Carriage 42 is an open horizontally disposed frame including a pair of spaced-apart cross frame members 54,55 interconnected by a pair of end frame members 56,57. As shown in FIG. 3, end frame members 56,57 are inverted channels to which carriage rolls 44,46 are journaled on respective shafts. Channel 56 also supports hydraulic carriage drive motor 50. Channels 56,57 also mount pairs of guide rollers 59,60 in conjunction with each primary carriage roll 44,46 to prevent the carriage from binding in its travel along the tracks.

Mitter assembly 36 is flexibly suspended from a central frame portion 66 of carriage 42 by suspension members 62,64, shown in FIG. 3. The mitter assembly includes a relatively rigid overhead mitter support structure 68 from which flexible elongated curtain-like mitter cleaning elements 70 are hung in vertical suspension.

The mitter assembly also includes mitter oscillating means 72 for rotatably oscillating the mitter support structure and thus the mitter cleaning elements as the assembly is moved on the supporting carriage 42 back and forth through the vehicle washing bay.

Although the mitter assembly may be one of several well-known constructions, the illustrated mitter assembly is of the type shown and described in the aforementioned copending application Ser. No. 06/437,454 filed Oct. 28, 1982, incorporated herein by reference. In such mitter assembly, the oscillating means 72 provides the mitter support structure 36 with both a horizontal and a vertical component of oscillation as the carriage moves the mitter assembly through the bay. Without going into great detail in this application, oscillator means 72 includes an oscillator arm 74 reciprocated by an eccentric drive plate 76 driven by a motor 78 (FIG. 1). The opposite end of arm 74 is pivotally connected at an offset position to a central mounting structure 80 which is rotatably connected by a suspension shaft 82 to the overhead central frame portion 66 of carriage 42. In summary, rotation of drive plate 76 reciprocates arm 74 which in turn rotationally oscillates the central mitter support structure 80 and the connected mitter assembly 36.

Elevating or pickup means, indicated generally at 84 in FIGS. 3 and 4, are provided for elevating the mitter cleaning elements 70 to a position above the space occupied by vehicle 22 so that the manual washing apparatus 26 can be used without interference when desired. The illustrated elevating means includes laterally displaceable means which when activated move laterally into the hanging curtain-like mitter elements 70 to swing the elements upwardly toward the mitter support structure 68. The laterally displaceable means comprises basically two components. One is a laterally displaceable sheet-like means indicated generally at 86, and the other is a laterally displaceable bar means indicated generally at 88. Both means are mounted as an assembly in suspension from mitter support carriage 42 at a vertical level below overhead mitter support 68 and between the upper and lower ends of the hanging mitter elements 70.

Sheet-like means 86 comprises a flexible sheet member 90, such as a rubberized canvas or other preferably water impervious material, which is normally stored in a roll 91 on a spindle 93 at a position offset laterally from hanging mitter elements 70. Spindle 93 is biased in a counterclockwise direction, as viewed in FIG. 3, by an internal spring mechanism 94 to urge the sheet member 90 to its rolled up, retracted position. Spindle 93 is rotatably connected at its opposite ends to horizontal elevator support members 96, which in turn are suspended from carriage 42 by vertical suspension members 98,100. The free end of sheet member 90 terminates at a slide bar 102 which is connected at its opposite ends to a pair of cables 104,105. The opposite ends of bar 102 ride in horizontally extending channel tracks 106, one of which is shown in FIG. 3, secured to elevator support members 96. Cables 104,105 are stored on drums 108,109, respectively, interconnected by a cross shaft 110. A reversible hydraulic motor 112 is coupled to the drums by a drive shaft 114 and is selectively driven in either direction to either extend or retract sheet member 90.

From FIG. 3, it will be apparent that the horizontal path of extension of sheet member 90 crosses the vertical suspension path of mitter elements 70. Thus, when motor 112 rotates drums 108,109 clockwise to pull sheet member 90 from its roll, the sheet member moves across the path of the mitter elements, swinging them upwardly onto the sheet member, thereby elevating them while protecting a vehicle below from water or other washing liquid dripping from the elements. Conversely, when the drums are rotated counterclockwise by the motor, the sheet member retracts into a roll on spindle 93, releasing mitter elements 70. A scraper bar 115 mounted on the elevator support structure terminates just above sheet member 90 adjacent spindle 91 to prevent the retracting sheet member from drawing the mitter elements onto the spindle.

It will be noted that an excessively long sheet member 90 would be required to swing upwardly and support the full length of the mitter elements 70 if the elevating means comprises only such sheet member. Thus, the laterally displaceable bar means 88 is provided as part of the elevating means to shorten the required length of sheet member 90, and thereby conserve space. Bar means 88 comprises a roller bar 116 positioned at a level above sheet member 90. The roller bar has a retracted position offset to a side of the mitter elements opposite the roll 91 of sheet member 90, as shown in FIG. 4.

Roller bar 116 has rollers 118 mounted at its opposite ends for travel in laterally opposed channel tracks 120, one of which is shown in FIG. 3. The channel tracks 120 are mounted on opposed elevator support members 96. The roller bar is connected at its opposite ends to the lower runs of a pair of endless cables 122,123 trained about a pair of driven pulleys 124,125 and a pair of idler pulleys 126,127. A reversible hydraulic motor 128 drives pulleys 124,125 through a drive shaft 130 and interconnecting pulley shaft 132. Idler pulleys 126,127, like drive pulleys 124,125, are shaft-mounted, and all pulley shafts are journaled on elevator supports 96.

As viewed in FIG. 3, counterclockwise rotation of drive pulleys 124,125 causes cables 122,123 to pull roller bar 116, supported on its rollers 118 in channels 120, horizontally toward the right from its dashed-line retracted position 116a to its full-line extended position 116b. In so moving, the roller bar engages an upper length of hanging mitter elements 70, swinging them upwardly toward the right. Clockwise rotation of the drive pulleys has the opposite effect, retracting roller bar 116 to the left and releasing the mitter elements.

Referring again to FIG. 1, air dryer 40, of known construction, is mounted on a dryer carriage 140 which operates independently of mitter carriage 42. Dryer carriage 140 is mounted on rollers for travel along the same tracks 48,49 as mitter carriage 42. The dryer carriage operates from a starting position at the left end of the tracks 48 in FIG. 2, the opposite end of the tracks from the mitter carriage. Moreover, the dryer carriage moves through the bay only after the mitter carriage has completed its cycle of operation, so that the two carriages do not interfere with one another during their respective operations.

A coin box 142 is mounted on wall 12 of the bay to control operation of the washing apparatus described.

OPERATION

To use the described washing apparatus, a customer drives a vehicle through entrance 18 of washing bay 10 and stops it in the centered position 22 within the bay, shown in FIGS. 1 and 2. Initially, the mitter washing elements 70 are in their elevated positions above the vehicle, as shown in FIGS. 3 and 5.

If the customer desires only to use the manual washing apparatus, the required amount of money in the form of coins is deposited in coin box 142. This activates the manual spray wand 24 for use by the customer in washing the vehicle.

However, if the customer wishes to have the vehicle washed using the automatic scrubbing apparatus, including the mitters 70, additional coins are deposited in coin box 142 as required to activate such apparatus. Upon deposit of such coins, roller bar 116, shown in its extended position in FIG. 5, moves to the left to its retracted position shown in FIG. 6, dropping the upper length of mitter elements 70 onto the still-extended sheet member 90. Then, sheet member 90 moves from its extended position of FIG. 6 to its retracted position of FIG. 7, dropping the full length of the mitter elements 70 to their vertically suspended positions and onto the vehicle below. At about the same time, the mitter oscillator means begins oscillating the mitters, and the mitter carriage 42 begins its travel toward the left in FIG. 2 over the body of vehicle 22. At the same time, spray bar 38 sprays a cleaning solution onto the vehicle ahead of the mitters.

When the mitters 70 reach their left-hand position shown in dashed lines in FIG. 2, the carriage reverses its travel and begins moving back toward its starting position at the right end of the bay. As the return travel of carriage 42 commences, spray bar 38 begins spraying clean rinse water over the vehicle body behind the mitters to rinse the vehicle.

When the mitters have completed their travel and returned to their starting position, the mitter oscillating means is deactivated, and the mitter elevating means is activated to retract the mitter elements. To accomplish this, roller bar 116 extends toward the right, as shown in FIG. 8, from its retracted position to its extended position, thereby swinging the upper lengths of the mitter elements 70 upwardly but leaving the lower lengths of the mitter elements hanging. When the roller bar completes its movement to its extended position, sheet member 90 begins to unroll toward the left, as shown in FIG. 9, swinging the lower lengths of the mitter elements 90 upwardly and to the left to support them. As a result, the full lengths of the mitter elements are elevated to a level above the vehicle and prevented from dripping liquid onto the vehicle by the underlying sheet member 90. The elevating means remains in its active position, shown in FIGS. 3, 5 and 9, until the automatic washing apparatus is again activated through deposit of the necessary coins in coin box 142.

After the automatic apparatus has completed its cycle of operation and elevated the mitters out of the way, the customer may use the manual washing apparatus to wash the lower portions of the vehicle not reached by the mitters.

If the customer desires to use the dryer means 40 to dry the just-washed vehicle 22, additional coins are deposited in coin box 142 to activate the dryer and its carriage. When activated, dryer carriage 140 travels toward the right in FIG. 2 over the car to a position adjacent the starting position of the mitter carriage, as shown at 140a. Then it returns to its starting position at the exit end of the bay. When the drying cycle is completed, the customer drives the vehicle 22 from the bay through exit opening 20.

Having illustrated and described the principles of my invention by what is presently a preferred embodiment, it should be apparent to persons skilled in the art that the invention may be modified in arrangement, detail, and application without departing from such principles. I claim as my invention all such modifications as come within the true spirit and scope of the following claims.

I claim:

1. A car washing apparatus comprising:
   flexible curtain-like cleaning means,
   overhead support means for suspending said curtain-like means vertically into a vehicle space to clean a vehicle in said space upon relative movement between said vehicle and said support means,
   and elevating means for elevating a portion of said curtain-like means relative to said support means to clear said vehicle space, said elevating means including laterally displaceable means movable into said curtain-like means below said overhead support means to swing said curtain-like means upwardly about its connection to said support means.

2. Apparatus according to claim 1 wherein said laterally displaceable means includes a sheet-like member movable laterally across the path of the vertically suspended said curtain-like means to support lower portions of said curtain-like means above said vehicle space.

3. Apparatus according to claim 2 wherein said sheet-like means is impervious to water.

4. Apparatus according to claim 2 wherein said sheet-like means comprises a flexible sheet, and wherein said elevating means further includes means for rolling said flexible sheet into a roll at a retracted position laterally offset from said curtain like means, and means for extending said flexible sheet laterally from said roll across the path of the vertically suspended curtain-like means.

5. Apparatus according to claim 1 wherein said laterally displaceable means includes a first laterally displaceable means movable across the path of said vertically suspended curtain-like means in one direction below said overhead support means to swing a first portion of said curtain-like means upwardly, and second displaceable means movable across the path of said vertically suspended curtain-like means in a second direction below said first laterally displaceable means to fold a second portion of said curtain-like means upwardly.

6. Apparatus according to claim 5 wherein said second laterally displaceable means comprises a sheet-like means.

7. Apparatus according to claim 5 wherein said first laterally displaceable means comprises a bar means.

8. Apparatus according to claim 5 wherein said first laterally displaceable means comprises a bar means and said second laterally displaceable means comprises a sheet-like means.

9. Apparatus according to claim 5 wherein said second laterally displaceable means is movable laterally in a direction opposite the lateral direction of movement of said first laterally displaceable means to elevate said curtain-like means.

10. Apparatus according to claim 2 including carriage means for moving said overhead support means back and forth to move said curtain-like means generally horizontally through said vehicle position, said elevating means being supported on said carriage means.

11. Apparatus according to claim 10 including oscillating means on said carriage means for oscillating said overhead support means during movement of said carriage means back and forth.

12. Apparatus according to claim 2 including carriage means for moving said overhead support means back and forth to move said curtain-like means through said vehicle position, said elevating means being supported on said carriage means and including laterally displaceable means movable laterally into the vertically suspended said curtain-like means below said overhead support means and in a direction normal to the direction of travel of said carriage means.

13. In a vehicle washing system, apparatus for elevating a flexible vertically suspended free-hanging curtain-like cleaning means to an inactive position above the level of a vehicle to be washed, said apparatus comprising:
   pickup means positioned at a level vertically between the suspended upper end and the free lower end of said curtain-like means,
   displacement means for moving said pickup means laterally from a retracted position offset to one side of said curtain-like means into engagement with said curtain-like means and to an extended position to swing at least an upper portion of said curtain-like means upwardly and thereby elevate the lower end of said curtain-like means.

14. Apparatus according to claim 13 wherein said pickup means spans the maximum width of said curtain-like means in the direction of lateral movement of said pickup means.

15. Apparatus according to claim 13 wherein said pickup means includes laterally extensible sheet-like means which supports said curtain-like means in an elevated position in the extended position thereof.

16. Apparatus according to claim 13 wherein said pickup means includes a first pickup means movable across the path of the vertically suspended curtain-like means in one direction to swing an upper portion of said curtain-like means upwardly, and a second pickup means at a level below said first pickup means movable across the vertically suspended said curtain-like means in a direction opposite said one direction to swing a lower portion of said curtain-like means upwardly in a direction opposite the direction of swinging movement of said upper portion.

17. Apparatus according to claim 16 wherein said second pickup means comprises a laterally extensible water resistant sheet-like means.

18. In a vehicle washing system, a method of storing a mitter-type washing apparatus in an inactive nonobstructing position within a minimal space at a vehicle washing station, the mitter-type apparatus comprising an overhead support and hanging elongated mitter elements suspended from the overhead support, the method comprising:

swinging the upper lengths of the hanging mitter elements upwardly in one direction about their connections to the overhead support and swinging the lower lengths of the hanging mitter elements upwardly in an opposite direction relative to the overhead support to elevate the lower ends of the mitter elements above the level of a vehicle space at the washing station.

* * * * *